July 15, 1969 D. McINTYRE 3,455,085
CASE PACKING MACHINE FOR TIERED ARTICLES
Filed May 8, 1967 4 Sheets-Sheet 1
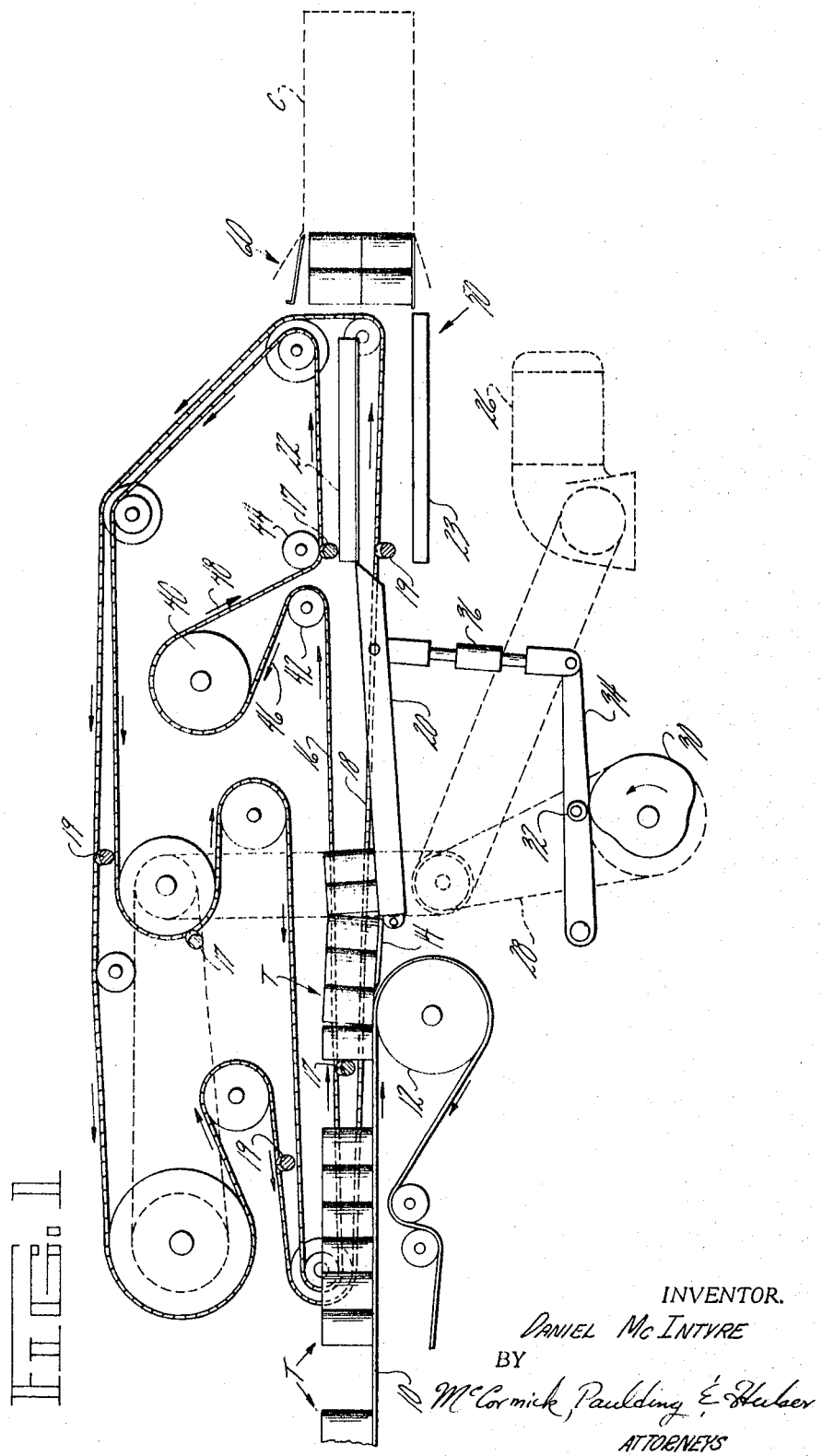
INVENTOR.
DANIEL McINTYRE
BY
McCormick, Paulding & Huber
ATTORNEYS

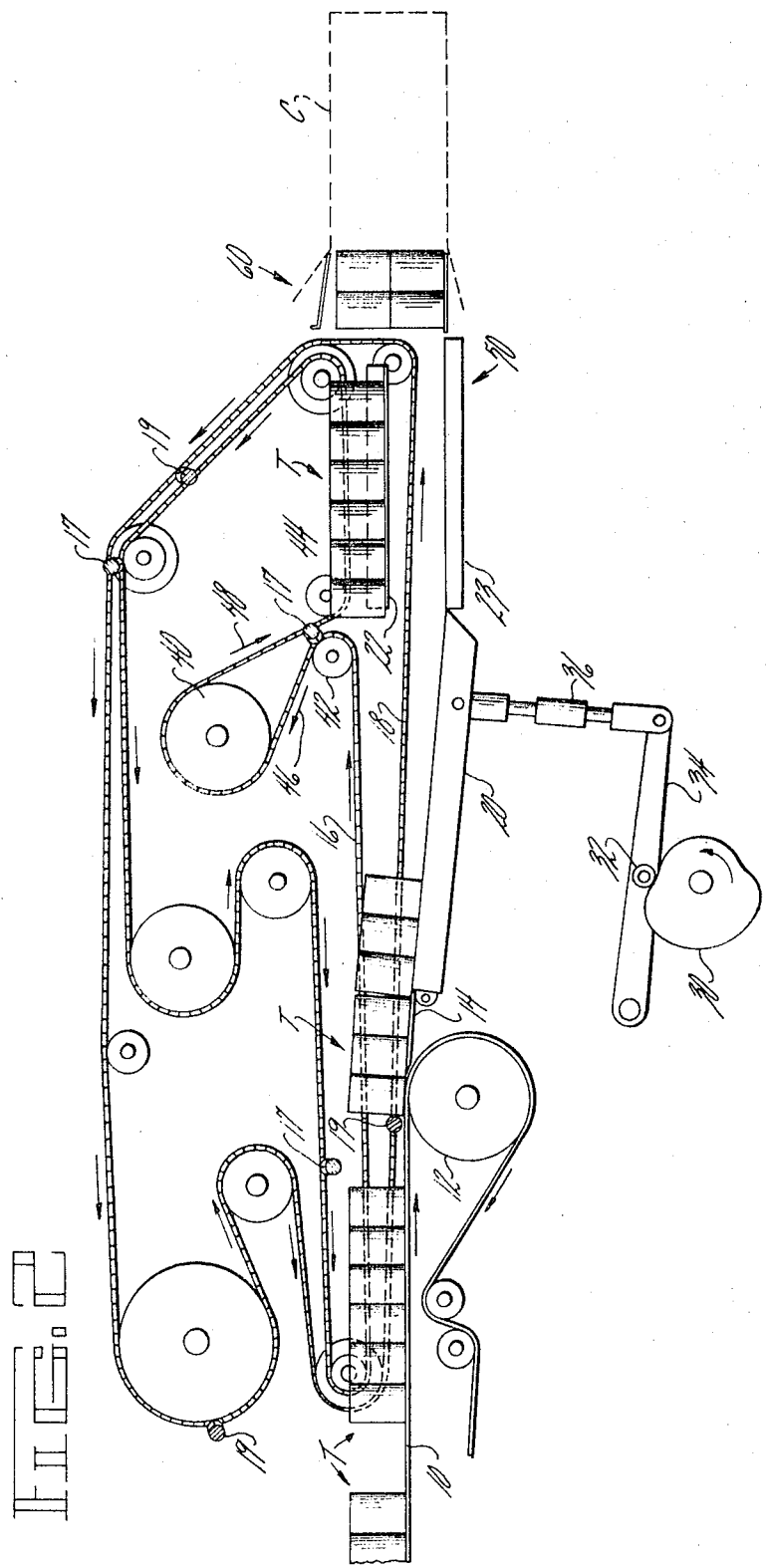

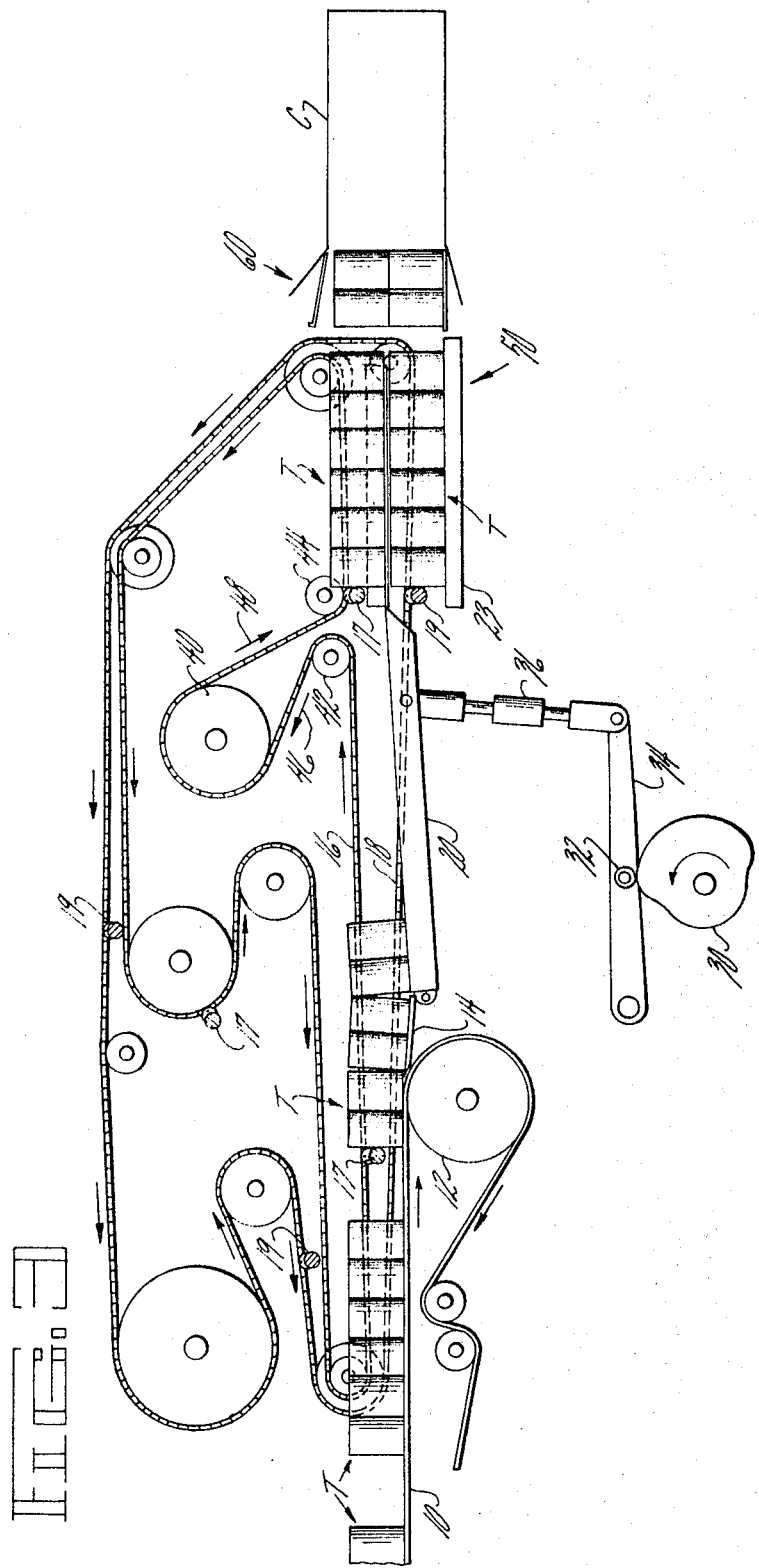

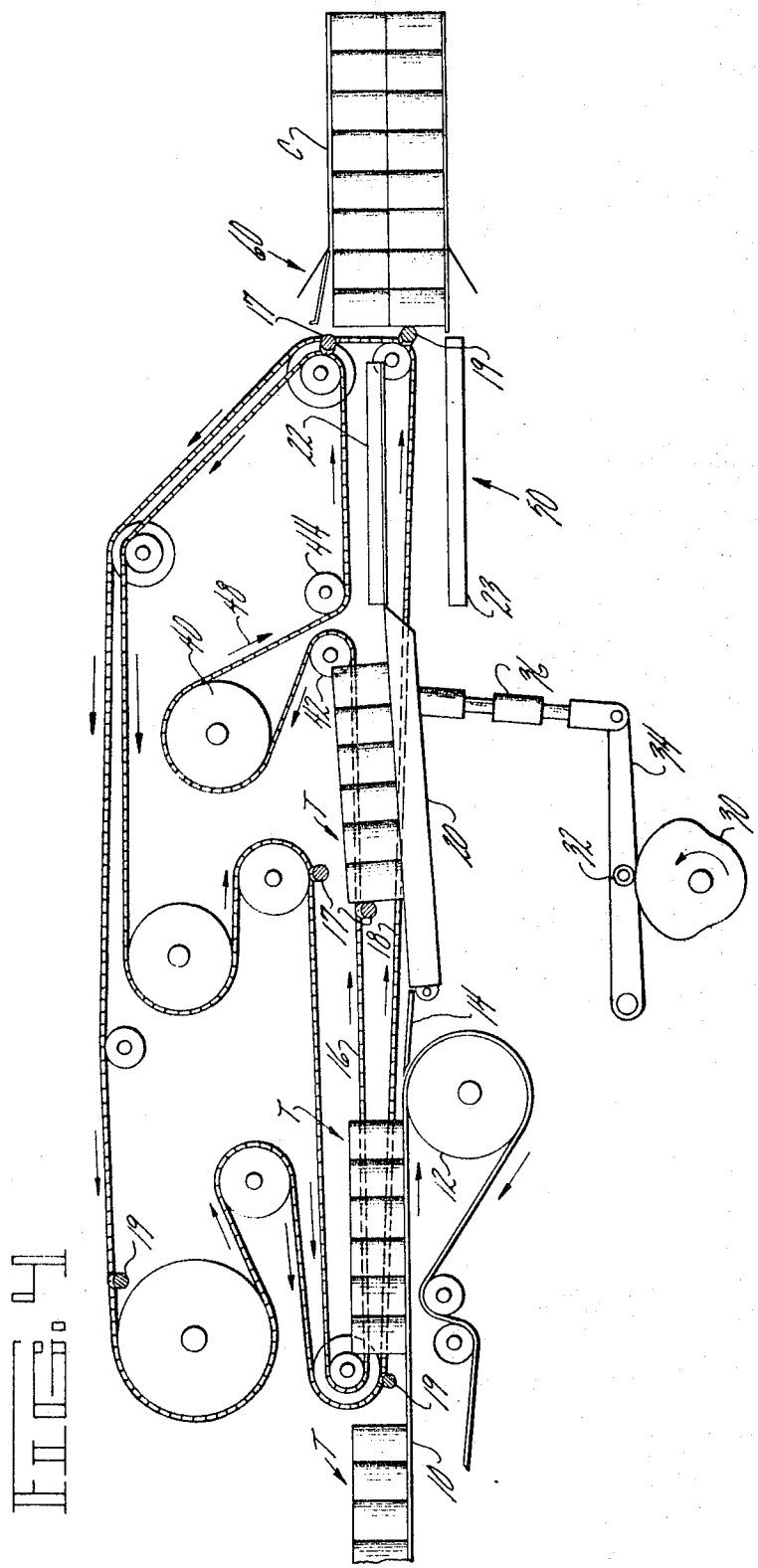

United States Patent Office 3,455,085
Patented July 15, 1969

3,455,085
CASE PACKING MACHINE FOR TIERED ARTICLES
Daniel McIntyre, Portland, Conn., assignor to Emhart Corporation, Bloomfield, Conn., a corporation of Connecticut
Filed May 8, 1967, Ser. No. 636,786
Int. Cl. B65b *35/30, 35/50;* B65g *59/00*
U.S. Cl. 53—153                                          7 Claims

ABSTRACT OF THE DISCLOSURE

An endless belt feeds segregated groups of articles to a pair of flight bar conveyors, one of which continuously feeds every other group of articles across a ramp and through a funnel into a packing case having a side or end opening. The other flight bar conveyor feeds the remaining groups of articles up a pivoted chute onto an upper portion of the ramp where the upper group or tier remains until it can be moved simultaneously with a group or tier being advanced across the lower portion of the ramp, whereby both tiers pass through the funnel at the same time. The flight bar conveyor associated with the upper tier has a lost motion for delaying each upper tier on the ramp, and both flight bar conveyors and the chute are operated by a common drive means.

Summary of the invention

This invention relates to case packing machines, and deals more particularly with an improved flight bar conveyor system for use in stacking the articles which have been segregated into groups on an infeed conveyor.

The general object of the present invention is to provide in a case packing machine a pair of flight bar conveyors which stack successive groups of articles in tiers prior to thrusting of the stacked tiers into an open case resting on its side.

Another object of the present invention is to provide a case packing machine of the foregoing character wherein a common drive means is used for operating both flight bar conveyors, and also for operating other portions of the machine.

The drawings show a preferred embodiment of the invention and such embodiment will be described, but it will be understood that various changes may be made from the construction disclosed, and that the drawings and description are not to be construed as defining or limiting the scope of this invention, the claims forming a part of this specification being relied upon for that purpose.

Brief description of the drawings

FIG. 1 is an elevational schematic view of a case packing machine which incorporates the present invention, showing the segregated groups of articles on the infeed conveyor with the group farthest downstream being carried off the infeed conveyor by one of the flight bar conveyors.

FIG. 2 is an elevational schematic view generally similar to FIG. 1 but showing the downstream group of articles after it has been positioned on the upper portion of the ramp associated with the funnel.

FIG. 3 is an elevational schematic view of the machine shown in FIGS. 1 and 2 at a slightly later instant of time wherein the second group of articles has been positioned on the lower portion of the ramp.

FIG. 4 is an elevational schematic view of the machine at a later instant of time wherein the stacked groups or tiers of articles on the ramp have been thrust through the funnel into an awaiting packing case.

Detailed description of preferred embodiment

Turning now to the drawings in greater detail, the complete case packing machine can be seen to include an infeed conveyor 10 which can be of the endless belt type and which is driven to advance articles from left to right as viewed in the drawings. Means (not shown) are operatively associated with the infeed conveyor 10 to segregate articles to be packed into groups. Each segregated groups of articles, as will be more fully understood hereinafter, will ultimately constitute a tier of the articles to be packed, and therefore, each such group of articles is designated generally by the reference character T. It will be understood that the machine to be described can be used in connection with a wide variety of articles, but for purposes of illustration the articles in each group or tier are shown to comprise a series of metal containers. Preferably, each tier is advanced on the conveyor 10 with the containers arranged in rows, and further, each tier includes six containers in each row so that the entire tier constitutes a multiple of the six containers shown schematically in the drawings.

As each group or tier reaches the end of the infeed conveyor 10, the containers are thrust by the conveyor onto a deadplate 14 arranged in a slightly downwardly inclined position generally tangent to the roll 12 associated with the downstream end of the infeed conveyor 10. The line pressure of the advancing containers on the conveyor 10 thrusts the containers in order, or sequence, and in engaged relationship off the infeed conveyor 10 and into the tier stacking mechanism which will now be described.

The tier stacking mechanism comprises first and second over head flight bar conveyors, indicated generally at 16 and 18 respectively a pivoted chute 20 over which the tiers of containers are advanced by said flight bar conveyors, and a two level ramp 50 associated with the funnel 60.

The first, or upper flight bar conveyor 16, comprises an endless chain located along each longitudinal side edge of the machine and includes a series of flight bars 17, 17 which are connected at their respective ends to uniformly spaced locations on these chains. The flight bars 17, 17 extend transversely of the machine and engage the rearmost containers in the rows of containers comprising every other tier so as to move these tiers upwardly along the chute 20. As shown in FIG. 1, one such flight bar 17 is shown engaging the first tier T as it leaves the downstream end of the infeed conveyor 10. Each of these flight bars 17, 17 may include a roller rotataby mounted thereon. The roller construction is especially advantageous when the containers are of sufficient size and weight as to require some sort of anti-friction device between the flight bar conveyor and the tiers to be moved.

As best shown in FIG. 2, the second flight bar conveyor 18 also comprises an endless chain mounted at either side of the machine with a series of flight bars 19, 19 connected at their respective ends to these chains in uniformly spaced relation therealong as shown. FIG. 2 shows the first tier T after it has been deposited on an upper portion or level 22 of the fixed ramp 50 associated with the funnel 60 of the machine, while the next susceeding tier T is shown as it is advanced off the infeed conveyor 10 by a flight bar 19 onto the downwardly inclined chute 20.

Both overhead flight bar conveyors 16 and 18 are driven by a single drive motor 26 (shown in FIG. 1) through a series of chains and sprockets so that each flight bar conveyor moves at the same lineal speed. The same drive motor 26 is utilized to raise and lower the pivotably mounted chute 20 through a chain and sprocket drive 28 and a rotary cam 30. As the cam 30 rotates, it engages a cam follower roller 32 on a pivotally supported arm 34, which arm at its free end is connected to a vertically movable rod 36. The upper end of the rod 36 is connected to the free end of the pivotably mounted chute 20. A rotating cam 30 located substantially in the center of the chute 20 moves the arm 34 to raise and lower the chute 20. A spring (not shown) may be provided to bias the arm and rod downwardly, thus biasing the pivoted chute downwardly.

It is an important feature of the present invention that the overhead flight bar conveyors 16 and 18 are not only operated at the same lineal speed, but are also of identical lengths so that the flight bars 17 and 19, associated respectively with these conveyors move in a constant relationship to one another. As a result of the common drive means used, it will be apparent that movement of the flight bars 17 and 19 occurs in timed relationship with pivotal movement of the chute 20. More particularly, the first flight bar conveyor 16 sweeps a first tier of articles or containers onto the upper portion 22 of the ramp when the chute 20 is raised as best shown in FIG. 1. The second flight bar conveyor 18 sweeps a succeeding, or second tier of articles, onto a lower portion 23 of the ramp when the chute is lowered as best shown in FIG. 2. Thus the flight bars 17 and 19 associated with the conveyors 16 and 18, must reach the tier-engaging point over the infeed conveyor 10 respectively, in alternate sequence to accomplish the motion just described. The chute 20 is provided between the endless chains associated with the second conveyor 18 the chute 20 does not interfere with the chains in the raised position of the chute shown in FIG. 1. When the flight bar 19, associated with the second conveyor 18, is advancing a tier of articles along the downwardly inclined chute 20, as shown in FIG. 2, the flight bars 19, 19 do not interfere with the chute 20.

As the second tier of articles is being advanced down the inclined chute 20 onto the lower portion 23 of the ramp, the first tier located on the upper portion 22 of the ramp is maintained in a stationary position by reason of a lost motion accomplished by the flight bar 17 associated with the first conveyor 16. An idler sprocket 40 rotatably mounted in the frame of the machine, in combination with the two closely spaced smaller sprockets 42 and 44, serve to lead the flight bars 17, 17 upwardly away from the tier T position on the upper portion 22 of the ramp. Each flight bar 17 thus moves upwardly around idler sprocket 42, linearly in the direction of arrow 46, peripherally around the sprocket 40, and downwardly in the direction of the arrow 48 in a lost motion which gives the second flight bar conveyor 18 time to feed a succeeding tier onto the lower portion 23 of the ramp 50. Once the flight bar 19 associated with the second flight bar conveyor 18 has cleared the chute 20, and the associated tier has been positioned on the lower portion 23 of the ramp, the chute 20 is raised to the position shown in FIG. 3 and the flight bars 17 and 19, both of which are now located at the upstream edge of the ramp, move simultaneously to thrust the stacked tiers of articles through the funnel 60 into the awaiting packing case C as shown in FIG. 4.

Still with reference to the FIG. 4 configuration, it is noted that the packing case C is adapted to hold only the six containers in each row of each tier. With reference to the previous views, FIGS. 1–3, it is noted that a pair of articles, or containers, in each of the rows associated with both the upper and lower tiers is preloaded or prepositioned in the funnel 60 so that the flight bars 17 and 19 need only advance to the downstream end of the ramp 50 in order to load the packing case C positioned on the funnel 60. As indicated by the foregoing description of container movement between FIG. 3 and FIG. 4, the two pairs of containers preloaded in the funnel 60 will be thrust into the case C, and the last pair of containers in each of the rows in the upper and lower tiers will remain in the funnel so as to serve as a preload for the next succeeding upper and lower tiers advanced to the ramp 50.

I claim:

1. In a case packing machine of the type having an infeed conveyor for advancing segregated multi-row tier-forming groups of articles and also having a packing funnel provided with a multi-level ramp for supporting at least two tiers of articles one on top of another before the tiers are thrust through the funnel into a case, the improvement comprising a chute disposed between the conveyor and the funnel and pivotally supported at its end adjacent the conveyor, continuous drive means for alternately raising and lowering the other end of the chute adjacent the funnel, a first overhead flight bar conveyor supported in part over the downstream end portion of the infeed conveyor and supported in part at the downstream end of the ramp, said first flight bar conveyor being operated by said drive means in timed relationship with the raising and lowering of said chute to sweep a first tier of articles onto an upper portion of said ramp when the chute is raised and then to execute a lost motion when said chute is lowered, a second flight bar conveyor supported in part over the downstream end portion of the infeed conveyor and supported in part at the downstream end of the ramp in spaced vertical relation below said first flight bar conveyor, said second flight bar conveyor also being operated by said drive means in timed relationship with the raising and lowering of said chute to sweep a second tier of articles onto a lower portion of said ramp when the chute is lowered, both of said flight bar conveyors simultaneously sweeping said first and second tiers off said upper and lower ramp portions respectively when said chute is raised.

2. The improvement in a case packing machine as set forth in claim 1 wherein the drive means for raising and lowering the chute includes a continuously driven rotary cam, linkage connected with said chute and operated by said cam for pivoting said chute, chain and sprocket means interconnecting said flight bar conveyors for movement at the same lineal speed.

3. The improvement in a case packing machine as set forth in claim 2 wherein said flight bar conveyors each comprise a pair of endless chains entrained over sprockets rotatably mounted in the machine frame, said pairs of chains associated with both flight bar conveyors being of equivalent length.

4. The improvement in a case packing machine as set forth in claim 3 wherein said first flight bar conveyor chains are directed upwardly away from said raised chute and adjacent the downstream end of said chute thence peripherally around an idler sprocket and downwardly toward the upstream end of the upper portion of said ramp to execute said lost motion when said chute is lowered to receive said second tier of articles.

5. The improvement in a case packing machine as set forth in claim 1 wherein said flight bar conveyors each comprise a pair of endless chains entrained over sprockets rotatably mounted in the machine frame, tier engaging first flight bars connected at either end to equally spaced points on said first pair of chains, tier engaging second flight bars connected at either end to equally spaced points on said second pair of chains.

6. The improvement in a case packing machine as set forth in claim 5 wherein one of said first flight bars engages said first tier of articles to sweep said first tier onto an upper portion of said ramp when said chute is raised, and wherein one of said second flight bars engages said second tier to sweep said second tier onto a lower portion of said ramp when said chute is lowered, said one flight bar of said first bars executing a lost motion when said chute is so lowered, and both said one flight bars then simultaneously sweeping said first and second tiers of articles off said ramp when said chute is raised.

7. The improvement in a case packing machine as set forth in claim 6 wherein each of said first flight bars is successively moved upwardly away from said raised chute and adjacent the downstream end of said chute by said first pair of endless chains, said first flight bars being subsequently carried by said chains peripherally around an idler sprocket and then downwardly toward the upstream end of the ramp upper portion when said chute is lowered to receive said second tier.

References Cited

UNITED STATES PATENTS

| | | | |
|---|---|---|---|
| 3,178,007 | 4/1965 | Standley et al. | 53—159 XR |
| 3,201,912 | 8/1965 | Wozniak | 53—153 XR |
| 3,340,672 | 9/1967 | Kayser | 53—153 |
| 3,377,774 | 4/1968 | Nigrelli et al. | 53—159 XR |

THERON E. CONDON, Primary Examiner

B. L. SPRUILL, Assistant Examiner

U.S. Cl. X.R.

53—164; 198—35